United States Patent
Yoo

(10) Patent No.: US 11,128,455 B2
(45) Date of Patent: Sep. 21, 2021

(54) DATA ENCRYPTION METHOD AND SYSTEM USING DEVICE AUTHENTICATION KEY

(71) Applicants: TRUSST HOLDINGS INC., Seoul (KR); SOTIS, INC., Seoul (KR)

(72) Inventor: Jong Myeong Yoo, Incheon (KR)

(73) Assignees: TRUSST HOLDINGS INC., Seoul (KR); SOTIS, INC., Seoul (KR)

( * ) Notice: Subject to any disclaimer, the term of this patent is extended or adjusted under 35 U.S.C. 154(b) by 126 days.

(21) Appl. No.: 16/603,339

(22) PCT Filed: Oct. 19, 2017

(86) PCT No.: PCT/KR2017/011572
§ 371 (c)(1),
(2) Date: Oct. 7, 2019

(87) PCT Pub. No.: WO2018/186543
PCT Pub. Date: Oct. 11, 2018

(65) Prior Publication Data
US 2020/0044838 A1    Feb. 6, 2020

(30) Foreign Application Priority Data
Apr. 7, 2017  (KR) .................. 10-2017-0045056

(51) Int. Cl.
*H04L 29/06* (2006.01)
*H04L 9/08* (2006.01)

(52) U.S. Cl.
CPC .......... *H04L 9/0861* (2013.01); *H04L 9/0891* (2013.01); *H04L 63/068* (2013.01); *H04L 63/0876* (2013.01)

(58) Field of Classification Search
None
See application file for complete search history.

(56) References Cited

U.S. PATENT DOCUMENTS

| 7,900,047 B2 * | 3/2011 | Lyle | H04L 9/0838 |
| | | | 713/171 |
| 8,144,874 B2 * | 3/2012 | McGough | H04L 63/062 |
| | | | 380/277 |

(Continued)

FOREIGN PATENT DOCUMENTS

| JP | 2001-285278 | 10/2001 |
| JP | 2011-004039 | 1/2011 |

(Continued)

OTHER PUBLICATIONS

Chang, Ya-Fen et al. Comments on a Secret-Key-Privacy-Preserving Authentication and Key Agreement Scheme. 2011 Fifth International Conference on Genetic and Evolutionary Computing, https://ieeexplore.ieee.org/stamp/stamp.jsp?tp=&arnumber=6042743 (Year: 2011).*

Jia, Hongyong et al. Efficient and scalable multicast key management using attribute based encryption. 2010 IEEE International Conference on Information Theory and Information Security. https://ieeexplore.ieee.org/stamp/stamp.jsp?tp=&arnumber=5689577 (Year: 2010).*

(Continued)

*Primary Examiner* — Jeremiah L Avery
(74) *Attorney, Agent, or Firm* — Kevin J. Carroll; Grossman, Tucker, Perreault & Pfleger PLLC

(57) ABSTRACT

Method and system of encrypting data using device authentication key disclosed. The system of encrypting data may include a transmitting device, configured to transmit a device identification information to request an authentication and a receiving device, configured to perform the authentication, and to generate an authentication key to provide to the transmitting device when the authentication is successful.

8 Claims, 7 Drawing Sheets

(56) References Cited

U.S. PATENT DOCUMENTS

| | | | | |
|---|---|---|---|---|
| 8,144,875 | B2* | 3/2012 | McGough | H04L 63/08 380/277 |
| 8,862,879 | B2* | 10/2014 | Lerner | H04L 9/3218 713/168 |
| 9,729,541 | B2* | 8/2017 | Qian | H04L 9/3263 |
| 9,871,772 | B1* | 1/2018 | Weinstein | H04L 9/0825 |
| 2006/0204003 | A1* | 9/2006 | Takata | H04L 9/0891 380/30 |
| 2012/0027210 | A1* | 2/2012 | Takeuchi | H04L 9/0861 380/255 |

FOREIGN PATENT DOCUMENTS

| | | |
|---|---|---|
| JP | 2013-081028 | 5/2013 |
| KR | 10-2015-0095273 | 8/2015 |
| KR | 10-1695760 | 1/2017 |

OTHER PUBLICATIONS

Karthik, Kannan. Key search and adaptation based on association rules for backward secrecy. 2015 IEEE International Workshop on Information Forensics and Security (WIFS). https://ieeexplore.ieee.org/stamp/stamp.jsp?tp=&arnumber=7368582 (Year: 2015).*

Zhenpeng, Liu et al. Multi-authority Attribute Based Encryption with Attribute Revocation. 2014 IEEE 17th International Conference on Computational Science and Engineering. https://ieeexplore.ieee.org/stamp/stamp.jsp?tp=&arnumber=7023855 (Year: 2014).*

Mallissery, Sanoop et al. Transport and traffic rule violation monitoring service in ITS: A secured VANET cloud application. 2015 12th Annual IEEE Consumer Communications and Networking Conference (CCNC). https://ieeexplore.ieee.org/stamp/stamp.jsp?tp=&arnumber=7157979 (Year: 2015).*

English translation of International Search Report from corresponding PCT Appln. No. PCT/KR2017/011572, dated Jan. 24, 2018.

* cited by examiner

Authentication key : 10101011

Mathematical transform:
use result (10101101) by
adding number two (10)

Encryption list

0 : 1010 (Preceding 4 digits)
1 : 1101 (Postceding 4 digits)
2 : 1100 (Preceding 4 digits + 2)
⋮

FIG. 4

DATA ENCRYPTION METHOD AND SYSTEM USING DEVICE AUTHENTICATION KEY

FIELD OF TECHNOLOGY

The present invention relates to method and system of encrypting data using device authentication key during data communication between terminals.

RELATED ART

Recently, due to the development of wireless communication, data communication between various electronic devices has been performed. Accordingly, the importance of security is increasing. Security data is a kind of data that should be secured to any undesignated recipients such as a hacker or an unauthorized person, and may include not only an electronic certificate but also general data to be treated in secured way.
Security data is encrypted to prevent important information from being exposed even if security data is leaked during data communication.
But, in most of data encryption technologies, since information needed for decrypting the encrypted data (i.e., a decryption method, a recipient authentication key, and so on) is included in data being communicated, it is possible that a hacker can decrypt security data with information.

OBJECTIVES OF THE INVENTION

The present invention is invented to solve aforementioned shortcomings, it is intended to provide a data encryption method using device authentication key in which data to be communicated includes encrypted data only and does not include any information needed for decryption.

The present invention is intended to provide a data encryption method using device authentication key in which data is encrypted by using a plurality of encryption keys in order to reinforce security.

Other objectives and advantages will be easily understood from the following description.

SUMMARY

According to one aspect of the present invention, there is provided a system of encrypting data. The system of encrypting data may include a transmitting device, configured to transmit a device identification information to request an authentication and a receiving device, configured to perform the authentication, and to generate an authentication key to provide to the transmitting device when the authentication is successful, wherein the transmitting device generates, by using the authentication key, an encryption list having a plurality of encryption keys according to a rule agreed with the receiving device, selects an in-use encryption key that is selected from the plurality of encryption keys in the encryption list according to a predetermined rule, and encrypts a transmission data to be transmitted to the receiving device with the in-use encryption key, wherein the receiving device generates a decryption list having a plurality of decryption keys on receiving the encrypted transmission data, selects one of the plurality of decryption keys in the decryption list according to the predetermined rule, and decrypts the transmission data with the selected decryption key.

The receiving device may generate a new authentication key every time the receiving device performs the authentication on the transmitting device.

The receiving device may transmit a time value corresponding to a generation time of the authentication key, wherein the predetermined rule allows the transmitting device and the receiving device to select the encryption key or the decryption key by using the time value.

The encryption of transmission data in the transmitting device may be performed in steps of: dividing the transmission data into n data segments and generating an array having n numerical values that are randomly generated by using the time value, selecting, based on each numerical value as an order, encryption keys respectively corresponding to each of data segments from the encryption list, and encrypting each of data segments with selected encryption keys respectively corresponding to each of data segments.

The receiving device may count a generation number of authentication keys that are provided to the transmitting device, and wherein the transmitting device further uses the generation number to select the in-use encryption key.

According to another aspect of the present invention, there is provided a method of encrypting data being executed in a transmitting device. The method may include requesting an authentication after accessing a receiving device, receiving an authentication key from the receiving device that performs the authentication, generating, by using the authentication key, an encryption list having a plurality of encryption keys according to a rule agreed with the receiving device, selecting an in-use encryption key from the plurality of encryption keys to encrypt a transmission data, and transmitting encrypted transmission data to the receiving device The method may further include receiving a time value corresponding to a generation time of the authentication key from the receiving device, wherein the in-use encryption key is selected based on the time value in order for the receiving device to select a decryption key corresponding to the in-use encryption key based on the time value The encrypting the transmission data may include dividing the transmission data into n data segments and generating an array having n numerical values that are randomly generated by using the time value, selecting, based on each numerical value as an order, encryption keys respectively corresponding to each of data segments from the encryption list, and encrypting each of data segments with selected encryption keys respectively corresponding to each of data segments.

Other aspects, features, and advantages will be more apparent from accompanying drawings, claims and detailed description.

EFFECTS OF THE INVENTION

According to embodiment of the present invention, security can be reinforced by communicating data that includes encrypted data only and does not include any information for decryption when transmitting data.

In addition, security can be more strongly reinforced by encrypting data with a plurality of encryption keys so it can be practically impossible to decrypt data with any of exposed encryption keys or decryption keys.

BRIEF DESCRIPTION OF DRAWINGS

FIG. 4 illustrates a method of generating an encryption list having a plurality of encryption keys according to one embodiment of the present invention;

DETAILED DESCRIPTION

Figure 1:
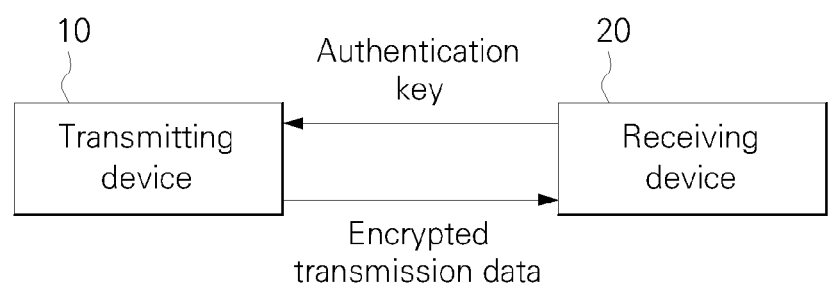
FIG. 1 is a diagram of data encryption system using a device authentication key according to one embodiment of the present invention.

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms such as first, second, etc., may be used to refer to various elements, but, these elements should not be limited due to these terms. These terms will be used to distinguish one element from another element.

Terms such as "module", "unit", "part" mean an element configured for performing a function or an operation. This can be implemented in hardware, software or combination thereof.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Figure 2:
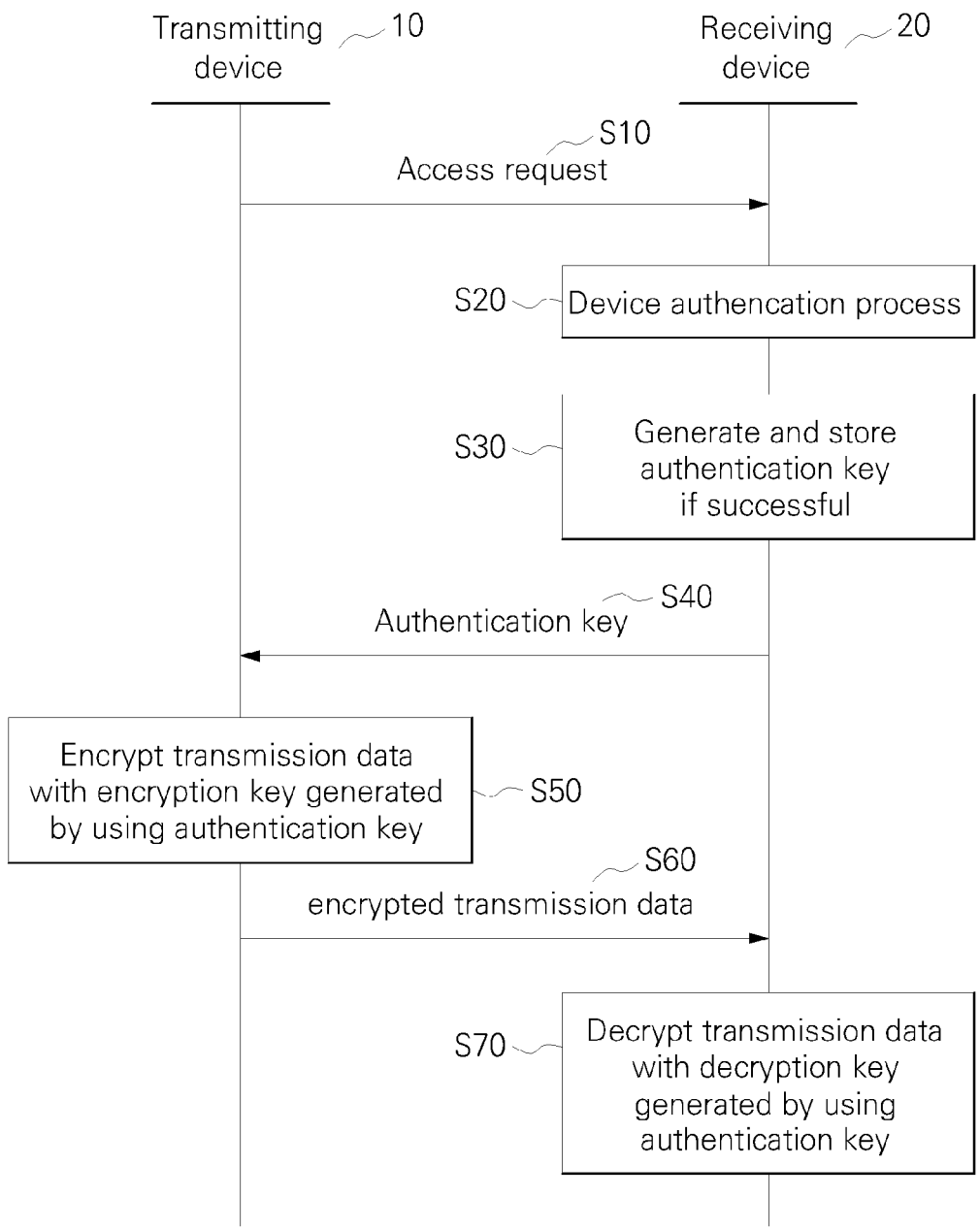
FIG. 2 is a flowchart showing a data encryption process according to one embodiment of the present invention.

FIG. 1 is a diagram of data encryption system using a device authentication key according to one embodiment of the present invention, and FIG. 2 is a flowchart showing a data encryption process according to one embodiment of the present invention.

Referring to FIG. 1, the system includes a transmitting device 10 for encrypting and transmitting data and a receiving device 20 for providing an authentication key to be used in an encryption process.

In a communication between two devices, any one of devices performs a function of the transmitting device 10 for transmitting the encrypted data, and another device performs a function of the receiving device 20 the generating the authentication key for the encryption process and also receiving the encrypted data.

For example, the transmitting device 10 may be a communication terminal having a sensor, and the receiving device 20 may be a gateway. This is, of course, one example, and all of the transmitting device 10 and the receiving device 20 may be the communication terminal such as a smart phone or a tablet PC. And, a single communication terminal may perform any one function of transmitting device 10 and receiving device 20, if necessary. For example, one communication terminal to transmit data may perform the function of transmitting device 10, and another communication terminal to receive data may perform the function of receiving device 20.

Referring to FIGS. 1 and 2, when the receiving device 20 receives a request for access from the transmitting device 20 at S10, the receiving device 20 performs a device authentication on whether the transmitting device 10 is an authenticated device at S20. The transmitting device 10 can request an authentication by providing a unique device identification information such as MAC address or device serial number, and the receiving device 20 can authenticate the transmitting device 10 based on a prestored identification information on available communication terminal.

When the authentication was successful, the receiving device 20 generates and stores an authentication key at S30, and provides the authentication key to the transmitting device at S40.

As one example, every time the transmitting device 10 requests access in order to transmit data, the receiving device 20 can generate and provide a new authentication key to the transmitting device 10. In this case, as a new encryption key is used because the authentication key is changed every time, the security will be reinforced. It is because the transmitting device 10 generates the encryption key by using the authentication key and the receiving device 20 generates a decryption key by using the authentication key, and this will be described below in detail.

As aforementioned, the transmitting device 10 generates the encryption key by using the authentication key according to a rule that is agreed between the transmitting device 10 and the receiving device 20 in advance, encrypts data to be transmitted (hereinafter referred as 'transmission data') with the encryption key at S50, and provides transmission data to the receiving device 20 at S60.

The receiving device 20 decrypts the transmission data with the decryption key for a decryption process that is generated by using the authentication key in a same manner as in the transmitting device 10 at S70. Namely, the decryption key is generated according to the rule that is agreed between the transmitting device 10 and the receiving device 20 in advance.

And, as one example, the transmitting device 10 can generate a plurality of encryption keys by using the authentication key. Hereinafter a data encryption process that the transmitting device 10 performs will be described.

Figure 3:
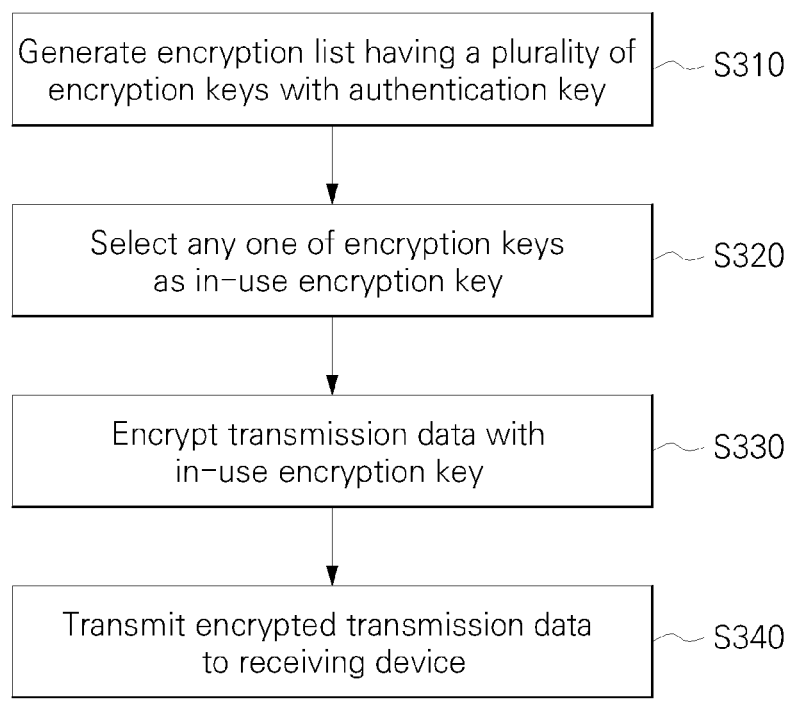
FIG. 3 is a flowchart showing a data encryption process performed on a transmitting device according to one embodiment of the present invention.
Figure 5:
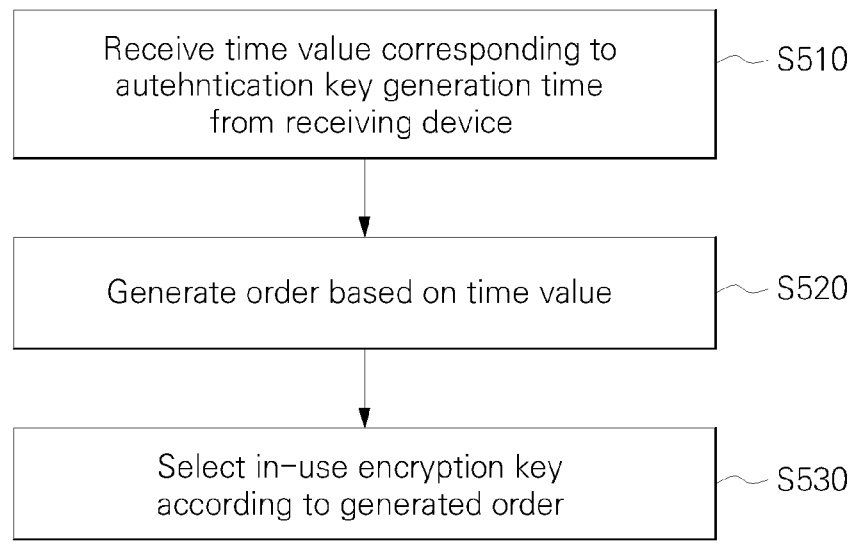
FIG. 5 is a flowchart showing a process of selecting an in-use encryption key according to one embodiment of the present invention.

FIG. 3 is a flowchart showing a data encryption process performed on a transmitting device 10 according to one embodiment of the present invention, FIG. 4 illustrates a method of generating an encryption list having a plurality of encryption keys according to one embodiment of the present invention, and FIG. 5 is a flowchart showing a process of selecting an in-use encryption key according to one embodiment of the present invention.

Referring to FIG. 3, the transmitting device 10 generates an encryption list having the plurality of encryption keys by using the authentication key provided from the receiving device 20 at S310.

Referring together with FIG. 4 which illustrates an example of generating the encryption list, when the authentication key is [10101011] in binary, the transmitting device 10 can generate the encryption list having the plurality of encryption keys by using [10101101] that is made by adding two (10 in binary) to [10101011] according to the rule agreed with the receiving device 20. As shown in FIG. 4, preceding four digits, postceding four digits, preceding four digits with number two added and so on can be used as the encryption keys.

The transmitting device 10 can the encryption list having the plurality of encryption keys by applying a mathematical algorithm of changing a value of the authentication key according to the rule agreed with the receiving device 20. The method of generating encryption keys with reference to FIG. 4 is just one example, and any methods that generate encryption keys by changing the authentication key according to various rules can be utilized The transmitting device 10 selects any one of the plurality of encryption keys in the encryption list as an in-use encryption key at S320, encrypts transmission data at S330, and transmits it to the receiving device 20 at S340.

In one example, the transmitting device 10 can select the in-use encryption key from the encryption list in a random way, and can provide, together with transmission data, an encryption identification information indicating which encryption key among the plurality encryption keys in the encryption list is used to the receiving device 20.

Accordingly, the receiving device 20 can generate, by using the authentication key, a decryption list having a plurality of decryption keys according to the rule agreed with the transmitting device 10, and can decrypt the encrypted transmission data by selecting a proper decryption key based on the encryption identification information.

In another example, by setting the transmitting device 10 and the receiving device 20 to use the in-use encryption key according to the rule agreed in advance, it is possible that the transmitting device does not need to provide the encryption identification information. In this case, on receiving transmission data, the receiving device 20 can select the proper decryption key according to the rule agreed with the transmitting device 10 from the plurality of decryption keys in the decryption list that is generated by the authentication key.

As the rule for selecting the encryption key or the decryption key, in one example, generation time information on when the receiving device 10 generated the authentication key can be utilized. For example, the time when the authentication key was generated can be quantified, a value can be generated by applying a predetermined mathematical transform to the quantified number, and any encryption key (or decryption key) in the order of the generated value as an order value can be selected.

For sake of understanding, if the generation time is AM 10:15, AM is converted into 1 (PM is 2), and then [8] that is sum of all digits of the remaining time value [11015] is used as the order value of encryption key. Thus, the transmitting device 10 will use the $8^{th}$ encryption key in the encryption list as the in-use encryption key, and the receiving device 20 will decrypt transmission data with the $8^{th}$ decryption key in the decryption list.

Referring to FIG. 5 illustrating this embodiment, the transmitting device 10 receives the time value corresponding to the generation time of authentication key from the receiving device 20 at S510, and as aforementioned, generates the order value by using the time value according to a rule agreed with the receiving device 20 in advance at S520.

The transmitting device 10 encrypts transmission data with the in-use encryption key that is the encryption key in the order of the order value from the plurality of encryption keys in the encryption list at S530. In same manner, when receiving transmission data, the receiving device 20 generates the order value using the time value based on the generation time of authentication key and decrypts transmission data with the decryption key in the order of the order value from the plurality of decryption keys in the decryption list.

Although not shown in drawings, according to another example, like the generation time of authentication key, a generation number indicating how many authentication keys are generated can be utilized to select encryption key (or decryption key). Namely, the receiving device 20 can count the generation number of authentication keys that are provided to the transmitting device 10 (as aforementioned, the receiving device 20 can generate a new authentication key every time the transmitting device 10 is authenticated), and provide the generation number to the transmitting device 10. In the same or similar manner of the generation time of authentication key, the transmitting device 10 or the receiving device 20 can further utilize the generation number to select the encryption key or the decryption key.

So far, the method of selecting one encryption key from the plurality of encryption keys are described. In another example, a plurality of encryption keys can be utilized to encrypt transmission data, and this will be described below with reference to related drawings.

Figure 6:
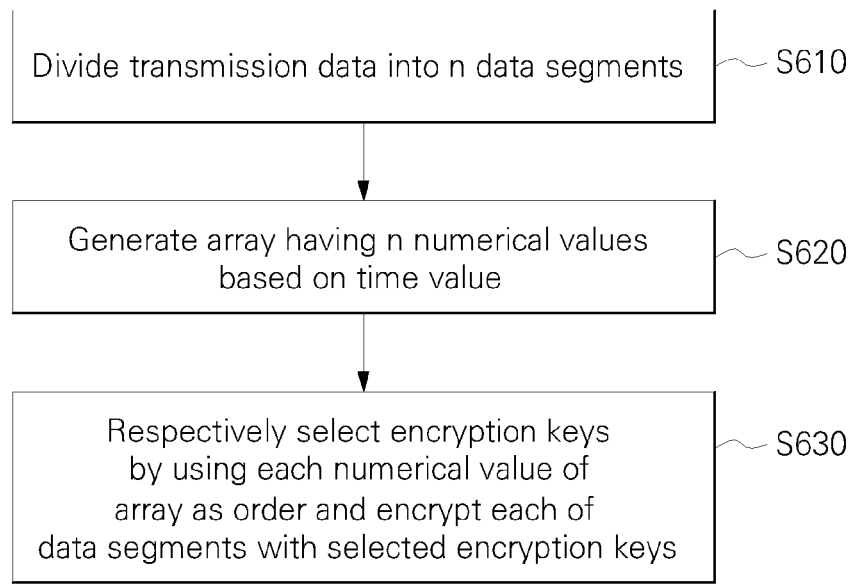
FIG. 6 is a flowchart showing an encryption process using a plurality of encryption keys according to one embodiment of the present invention.
Figure 7:
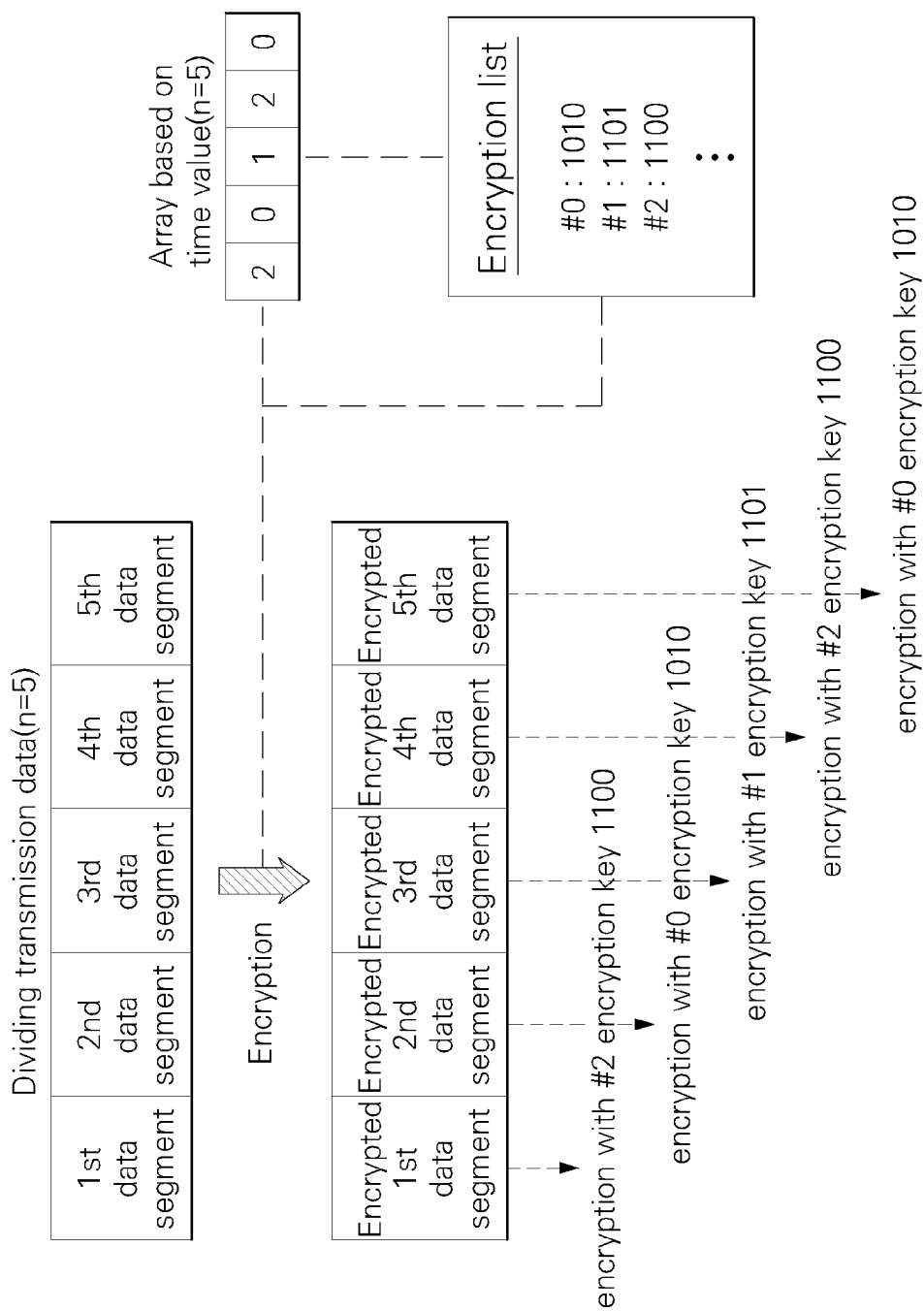
FIG. 7 illustrates a method of data encryption process using a plurality of encryption keys according to one embodiment of the present invention.

FIG. 6 is a flowchart showing an encryption process using a plurality of encryption keys according to one embodiment of the present invention, and FIG. 7 illustrates a method of data encryption process using a plurality of encryption keys according to one embodiment of the present invention.

Referring to FIG. 6, the transmitting device 10 divides transmission data into n data segments at S610. For example, transmission data can be divided by 16 bytes, and as a result, n data segments are generated.

The transmitting device 10 generates an array having n numerical values corresponding to the quantity of data segments by using the time value based on the generation time of authentication key at S620. Referring together with FIG. 7 showing one example, when n is five, the transmitting device 10 can generate an array having five numerical values by using the time value.

Referring to FIG. 6 again, the transmitting device 10 uses each of numerical values of the array that are generated by using the time value as an order for selecting encryption keys, and encrypts each of data segments by using selected encryption keys corresponding to each of data segments at S630.

Referring again to FIG. 7, each of five data segments are encrypted respectively by encryption keys that are selected based on each value of the array. In this example, since transmission data is encrypted by a plurality of encryption keys, the security can be reinforced. In detail, since transmission data is divided into several data segments and each of data segments is encrypted respectively by corresponding encryption keys, it is not possible to decrypt the whole of transmission data even if a portion of encryption data keys are exposed.

Similarly, when receiving transmission data, the receiving device 20 divides transmission data into n data segments, and decrypts each of data segments respectively with decryption keys selected in the same manner The method of encrypting data according to aforementioned description can be implemented as computer-readable codes on a computer-readable medium. The computer-readable medium can be, but not limited to, ROM (Read Only Memory), RAM (Random Access Memory), a magnetic tape, a magnetic disc, a flash memory, an optical data storage and so on. In addition, the computer-readable codes can be distributed to computer systems being connected through a communication network to be stored and executed in a distributed way.

While the invention has been described above with reference to exemplary embodiments, it will be understood by those skilled in the art that the invention can be modified and changed in various forms without departing from the concept and scope of the invention described in the appended claims.

What is claimed is:

1. A system of encrypting data, comprising:
a transmitting device, configured to transmit a device identification information to request an authentication; and
a receiving device, configured to perform the authentication, and to generate an authentication key to provide to the transmitting device when the authentication is successful,
wherein the transmitting device generates, by using the authentication key, an encryption list having a plurality of encryption keys according to a rule agreed with the receiving device, selects an in-use encryption key that is selected from the plurality of encryption keys in the encryption list according to a predetermined rule, and encrypts a transmission data to be transmitted to the receiving device with the in-use encryption key,
wherein the receiving device generates a decryption list having a plurality of decryption keys on receiving the encrypted transmission data, selects one of the plurality of decryption keys in the decryption list according to the predetermined rule, and decrypts the transmission data with the selected decryption key.

2. The system according to claim 1, wherein the receiving device generates a new authentication key every time the receiving device performs the authentication on the transmitting device.

3. The system according to claim 1, wherein the receiving device transmits a time value corresponding to a generation time of the authentication key, wherein the predetermined rule allows the transmitting device and the receiving device to select the encryption key or the decryption key by using the time value.

4. The system according to claim 3, wherein the encryption of transmission data in the transmitting device is performed in steps of:
dividing the transmission data into n data segments and generating an array having n numerical values that are randomly generated by using the time value;
selecting, based on each numerical value as an order, encryption keys respectively corresponding to each of data segments from the encryption list; and
encrypting each of data segments with selected encryption keys respectively corresponding to each of data segments.

5. The system according to claim 4, wherein the receiving device counts a generation number of authentication keys that are provided to the transmitting device, and wherein the transmitting device further uses the generation number to select the in-use encryption key.

6. A method of encrypting data being executed in a transmitting device, comprising:
requesting an authentication after accessing a receiving device;
receiving an authentication key from the receiving device that performs the authentication;
generating, by using the authentication key, an encryption list having a plurality of encryption keys according to a rule agreed with the receiving device;
selecting an in-use encryption key from the plurality of encryption keys to encrypt a transmission data; and
transmitting encrypted transmission data to the receiving device.

7. The method according to claim 6 further comprising receiving a time value corresponding to a generation time of the authentication key from the receiving device,
wherein the in-use encryption key is selected based on the time value in order for the receiving device to select a decryption key corresponding to the in-use encryption key based on the time value.

8. The method according to claim 7, wherein the encrypting the transmission data comprises:
dividing the transmission data into n data segments and generating an array having n numerical values that are randomly generated by using the time value;
selecting, based on each numerical value as an order, encryption keys respectively corresponding to each of data segments from the encryption list; and
encrypting each of data segments with selected encryption keys respectively corresponding to each of data segments.

* * * * *